US010974321B2

(12) United States Patent
Karlen

(10) Patent No.: US 10,974,321 B2
(45) Date of Patent: Apr. 13, 2021

(54) THERMAL CONTROL FOR ADDITIVE MANUFACTURING

(71) Applicant: Hamilton Sundstrand Corporation, Charlotte, NC (US)

(72) Inventor: Eric W. Karlen, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/599,917

(22) Filed: Oct. 11, 2019

(65) Prior Publication Data
US 2020/0038957 A1 Feb. 6, 2020

Related U.S. Application Data

(62) Division of application No. 15/182,456, filed on Jun. 14, 2016, now abandoned.

(51) Int. Cl.
B29C 64/295 (2017.01)
B22F 3/105 (2006.01)
B33Y 10/00 (2015.01)
B33Y 30/00 (2015.01)

(52) U.S. Cl.
CPC .......... B22F 3/1055 (2013.01); B29C 64/295 (2017.08); B33Y 10/00 (2014.12); B33Y 30/00 (2014.12); B22F 2003/1056 (2013.01); B22F 2999/00 (2013.01); Y02P 10/25 (2015.11)

(58) Field of Classification Search
CPC .... B29C 64/295; B29C 64/214; B29C 64/218
See application file for complete search history.

(56) References Cited

U.S. PATENT DOCUMENTS

| 8,584,357 | B2 | 11/2013 | Richter et al. | |
| 2003/0206820 | A1 | 11/2003 | Keicher et al. | |
| 2004/0200816 | A1 | 10/2004 | Chung et al. | |
| 2011/0042031 | A1 | 2/2011 | Furlong et al. | |
| 2012/0213659 | A1* | 8/2012 | Bayer | B32B 18/00 419/53 |
| 2013/0309420 | A1 | 11/2013 | Flesch et al. | |
| 2014/0239553 | A1 | 8/2014 | Bamberg et al. | |
| 2015/0064050 | A1 | 3/2015 | Retze et al. | |
| 2018/0079033 | A1* | 3/2018 | Krueger | B29C 64/25 |

FOREIGN PATENT DOCUMENTS

| EP | 2764935 A1 * | 8/2014 | ........... B29C 64/112 |
| GB | 341649 A * | 1/1931 | ............. B22D 23/06 |

OTHER PUBLICATIONS

The Induction Heating Guide, GH Induction Atmospheres, Aug. 2013 (Year: 2013).*

* cited by examiner

Primary Examiner — Timothy Kennedy
(74) Attorney, Agent, or Firm — Locke Lord LLP; Daniel J. Fiorello; Gabrielle L. Gelozin

(57) ABSTRACT

An additive manufacturing system for building a product includes a base plate for mounting the product thereon, and at least one heating element shaped to at least partially conform to the product and configured to apply heat to at least a portion of the product as the product is additively manufactured to reduce thermal gradients in the product.

4 Claims, 1 Drawing Sheet

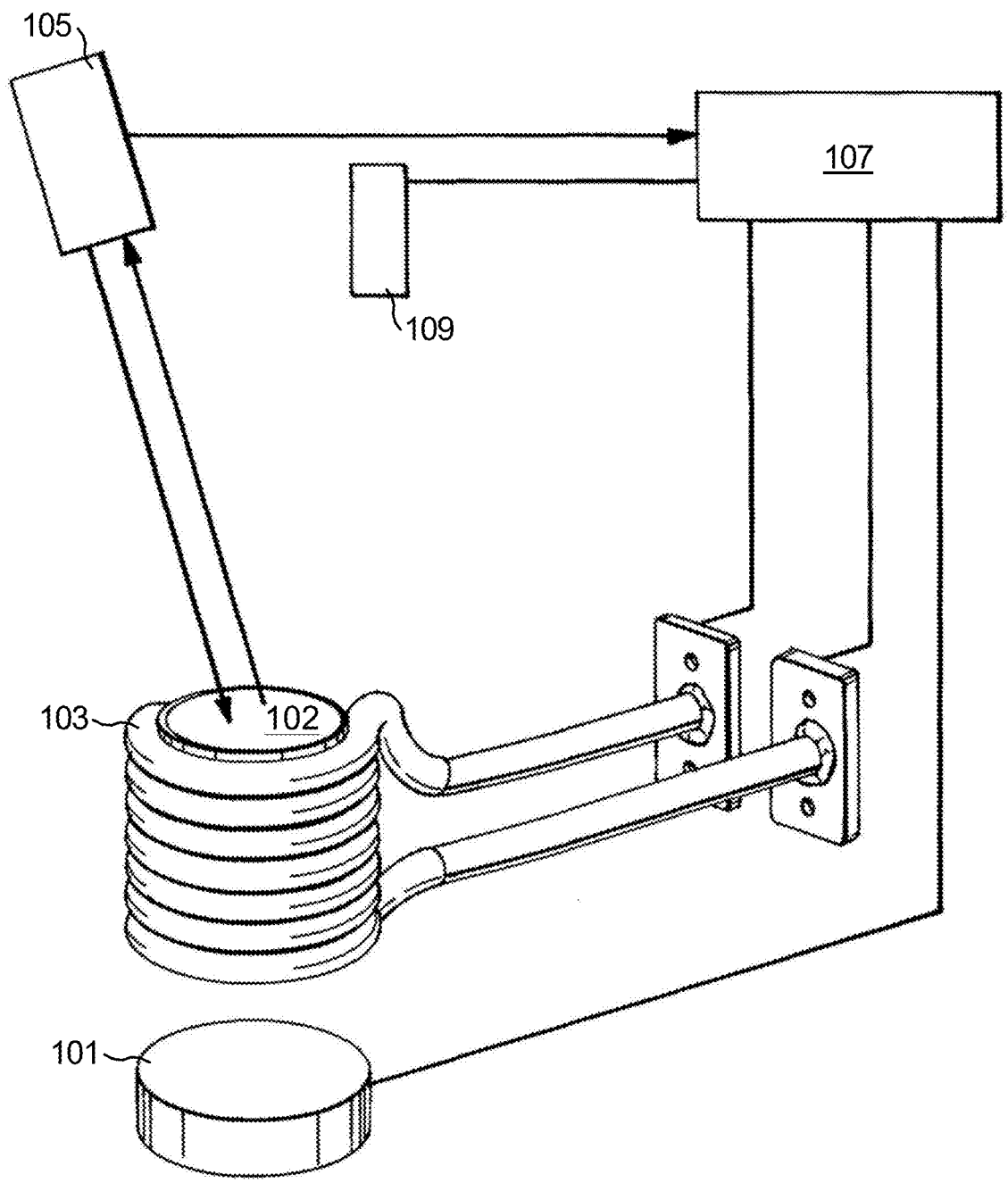

THERMAL CONTROL FOR ADDITIVE MANUFACTURING

CROSS-REFERENCE TO RELATED APPLICATION

This application is a divisional application of U.S. patent application Ser. No. 15/182,456 filed on Jun. 14, 2016, which is incorporated herein by reference in its entirety.

BACKGROUND

1. Field

The present disclosure relates to additive manufacturing, more specifically to thermal control for additive manufacturing.

2. Description of Related Art

All welding and joining processes create non-uniform residual stress distributions as a result of the intense heat input. Residual stresses due to thermal expansion and contraction of the solidified material can cause distortion of an additively manufactured part. Distortion can occur during the additive manufacturing process and/or during the heat treatment cycles after building. The residual stress in the part can relax during heat treatment causing significant distortion to occur.

As such, thermal management is required to prevent thermal contraction/shrinkage from occurring during the process. Thermal contraction can lead to layer misregistration where the layer being fused does not dimensionally correlate to the previous layer. Traditional additive manufacturing processes and systems do not control such non-uniform residual stresses.

Such conventional methods and systems have generally been considered satisfactory for their intended purpose. However, there is still a need in the art for improved thermal control for additive manufacturing. The present disclosure provides a solution for this need.

SUMMARY

An additive manufacturing system for building a product includes a base plate for mounting the product upon, and at least one heating element shaped to at least partially conform to the product and configured to apply heat to at least a portion of the product as the product is additively manufactured to reduce thermal gradients in the product (e.g., due to non-uniform heating/cooling of the product during sintering).

The heating element can be conformal to an outer shape of the product. The heating element can include an electric coil or any other suitable heating element.

In certain embodiments, the base plate can be configured to be heated. The system can include a thermal imaging device (e.g., an IR camera) positioned to view the product within the heating element for thermal monitoring of the product as it is additively manufactured.

The system can include a control unit operatively connected to the thermal imaging device and the heating element to control the heating element as a function of feedback from the thermal imaging device to prevent non-uniform heating of the product. In certain embodiments, the system can include an energy applicator positioned to apply energy within the heating element for layer-wise powder fusion.

A method for additively manufacturing a product includes additively manufacturing a product on a base plate and within a heating element, and applying heat to a portion of the product during additive manufacturing to reduce thermal gradients in the product, wherein heating the product occurs within a heating element configured to at least partially conform to the product. In certain embodiments, additive manufacturing the product can include depositing powder within the heating element.

The method can further include applying energy from an energy applicator to the powder within the heating element to sinter the powder within the heating element. In certain embodiments, the method can include controlling the heating element as a function of feedback from a thermal imaging device to prevent non-uniform heating of the product. The method can include heating the base plate.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain FIGURES, wherein:

FIG. 1 is a perspective exploded view of an embodiment of a system in accordance with this disclosure.

DETAILED DESCRIPTION

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. The systems and methods described herein can be used to reduce defects due to non-uniform heating/cooling during additive manufacturing.

Referring to FIG. 1, an additive manufacturing system 100 for building a product 102 includes a base plate 101 for mounting the product 102 upon and at least one heating element 103 shaped to at least partially conform to the product 102 (e.g., completely around, adjacent one or more lateral sides or portions thereof) and configured to apply heat to at least a portion of the product 102 as the product 102 is additively manufactured to reduce thermal gradients within the product 102. Any suitable number of heating elements 103 can be utilized. It should be understood that the heating element 103 may not actually increase temperatures within the product 102, but instead slow a rate of cooling of the product 102. In so doing, the heating element 103 may reduce thermal gradients in the product 102 (e.g., due to non-uniform heating/cooling of the product 102 during the additive manufacturing process)

In certain embodiments, the heating element 103 can be conformal to the outer shape of the product 102 such that it surrounds the product 102, for example. The heating element can include an electric coil (e.g., an induction coil) or any other suitable heating element that extends along a build axis.

In certain embodiments, the base plate 101 can be configured to be heated (e.g., via one or more heating elements disposed within the base plate 101). For example, the base plate 101 can include a resistive heating arrangement with heating elements attached to the bottom of the base plate 101 or embedded within the base plate 101 (e.g., using additive manufacturing techniques). Certain embodiments of the base plate 101 can have integral heat pipes that define heating channels for a heating fluid to be pumped through to stabilize temperature. In certain embodiments, a part may be used as the base for deposition to create features or shapes instead of manufacturing the entire part through additive manufacturing methods.

The system 100 can include a thermal imaging device 105 (e.g., an IR camera) positioned to view within the heating element 103 for thermal monitoring of the product 102 as it is additively manufactured. In certain embodiments, the system 100 can include an energy applicator 109 (e.g., a laser) positioned to apply energy within the heating element 103 for layer-wise powder fusion. While embodiments can be used with directed energy deposition or blown powder deposition processes (e.g., for metals), it is contemplated that molten material deposition (e.g., for thermoplastics) can also be utilized within the heating element.

As shown, the system 100 can include a control unit 107 operatively connected to the thermal imaging device 105, the heating element 103, the base plate 101, and/or the energy applicator 109 to control the heating element 103 and/or the energy applicator 109 and/or the base plate 101 as a function of feedback from the thermal imaging device 105 to prevent non-uniform heating and/or reduce thermal gradients within the product 102. For example, if a local hot spot is detected, the control unit 107 can cause the heating element 103 to apply more heat to the product 102 being built.

In accordance with at least one aspect of this disclosure, a method for additively manufacturing a product 102 includes additively manufacturing a product 102 on a base plate 101 and within a heating element 103. The method also includes applying heat to the product 102 during additive manufacturing to prevent non-uniform heating of the product 102.

In certain embodiments, additive manufacturing the product 102 can include depositing powder within the heating element 103. For example, powder can be dropped or sprayed (e.g., via a cold spray process) in any suitable manner. The heating element 103 can be progressively submerged in powder, or powder can be deposited only within the confines of the heating element 103 such as on the product 102 only, for example. It is contemplated that any other suitable method to place powder within the heating element 103 is contemplated herein.

The method can further include applying energy from an energy applicator 109 to the powder within the heating element 103 to sinter the powder within the heating element 103. In certain embodiments, the method can include controlling the heating element 103 as a function of feedback from a thermal imaging device 105 to prevent non-uniform heating of the product 102. The method can also include heating the base plate 101.

As described above, embodiments include a heating element that can be nearly conformal to the finished part. The heating element 103 extends in the z-axis (i.e., the axis in which the part is being built). Multiple heating elements 103 could be used as needed to optimize the thermal management throughout the production of a part. Also, the power settings for the heating element 103 could be varied as needed using pre-established parameters to create a smaller or larger induced magnetic field. The base plate 101 can also be utilized as the starting surface for manufacturing of the part. To maintain a uniform temperature, the base plate 101 can be heated.

Embodiments as described above allow for improved distortion control, consistent registration between layers, minimized temperature differences within part, reduced risk of solidification cracking or issues with solidification (e.g., during a laser fusion additive manufacturing process).

The methods and systems of the present disclosure, as described above and shown in the drawings, provide for additive manufacturing systems with superior properties as described above. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A method, comprising:
    designing a shape of a product;
    creating a shape of a first heating element to conform to the shape of the product;
    conforming the shape of the first heating element to an outer shape of the product to be produced in an additive manufacturing system;
    additively manufacturing the product on a base plate and within the first heating element;
    applying heat to a portion of the product using the first heating element during additive manufacturing to reduce thermal gradients in the product; and
    applying heat to a portion of the product using a second heating element during additive manufacturing to reduce thermal gradients in the product, wherein heating the second heating element includes heating one or more heating elements disposed within the base plate.

2. The method of claim 1, wherein additive manufacturing the product includes depositing powder within the heating element.

3. The method of claim 2, further comprising applying energy from an energy applicator to the powder within the heating element to sinter the powder within the heating element.

4. The method of claim 1, further comprising controlling the heating element as a function of feedback from a thermal imaging device to reduce thermal gradients in the product.

* * * * *